United States Patent
Goeckeritz et al.

(10) Patent No.: US 9,389,244 B2
(45) Date of Patent: Jul. 12, 2016

(54) VERTICAL EMBEDDED SENSOR AND PROCESS OF MANUFACTURING THEREOF

(71) Applicant: Applied Nanostructures, Inc., Mountain View, CA (US)

(72) Inventors: Jeremy J. Goeckeritz, San Jose, CA (US); Gary D. Aden, Redwood City, CA (US); Ami Chand, Milpitas, CA (US); Josiah F. Willard, Santa Clara, CA (US)

(73) Assignee: Applied Nanostructures, Inc., Mountain View, CA (US)

( * ) Notice: Subject to any disclaimer, the term of this patent is extended or adjusted under 35 U.S.C. 154(b) by 263 days.

(21) Appl. No.: 14/271,344

(22) Filed: May 6, 2014

(65) Prior Publication Data
US 2014/0338075 A1 Nov. 13, 2014

Related U.S. Application Data

(60) Provisional application No. 61/822,362, filed on May 11, 2013.

(51) Int. Cl.
*G01Q 70/14* (2010.01)
*G01Q 60/58* (2010.01)
*G01Q 70/16* (2010.01)
*B82Y 35/00* (2011.01)

(52) U.S. Cl.
CPC ............... *G01Q 70/14* (2013.01); *G01Q 60/58* (2013.01); *G01Q 70/16* (2013.01); *B82Y 35/00* (2013.01)

(58) Field of Classification Search
CPC ....... G01Q 70/14; G01Q 60/58; G01Q 70/16; B82Y 35/00
USPC .................... 850/22, 50, 56, 59–61
See application file for complete search history.

(56) References Cited

U.S. PATENT DOCUMENTS

| 5,929,438 | A | 7/1999 | Suzuki | |
|---|---|---|---|---|
| 6,566,650 | B1 * | 5/2003 | Hu | B82Y 35/00 250/281 |
| 2004/0028119 | A1 | 2/2004 | Takahashi et al. | |
| 2001/0202226 | | 10/2004 | Gianchandani | |
| 2012/0242189 | A1 * | 9/2012 | Sulzbach | B81B 7/0006 310/300 |

* cited by examiner

*Primary Examiner* — Michael Maskell
(74) *Attorney, Agent, or Firm* — Mark Rodgers

(57) ABSTRACT

A scanning probe assembly having a nanometer sensor element defined at a tip apex and its method of fabrication using micro-electromechanical systems (MEMS) processing techniques. The assembly comprises a probe body, a cantilever extending outward, and a hollow tip at the end of the cantilever. A first conductive material is disposed on the hollow tip, followed by a dielectric layer thus embedding the conductive layer. A nanometer hole is milled through the tip, first conductor and dielectric materials. A metal sensor element is deposited by means of electrochemical deposition in the through-hole. A second conductor is deposited on a lower layer. The first and second conductors form electrical connections to the sensor element in the tip. The intra-tip metal, in combination with other layers, may form a thermocouple, thermistor, Schottky diode, ultramicroelectrode, or Hall Effect sensor, and used as a precursor to grow spikes such a nanotubes.

20 Claims, 8 Drawing Sheets

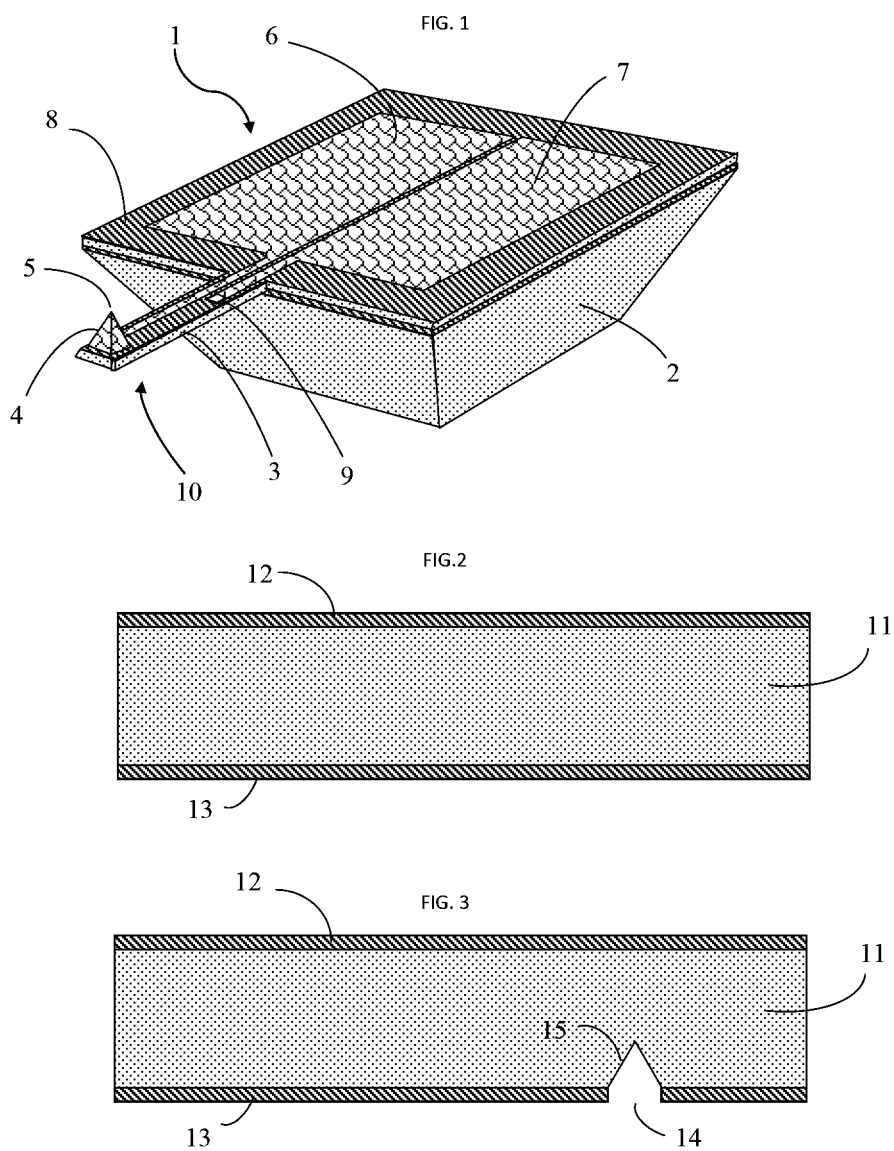

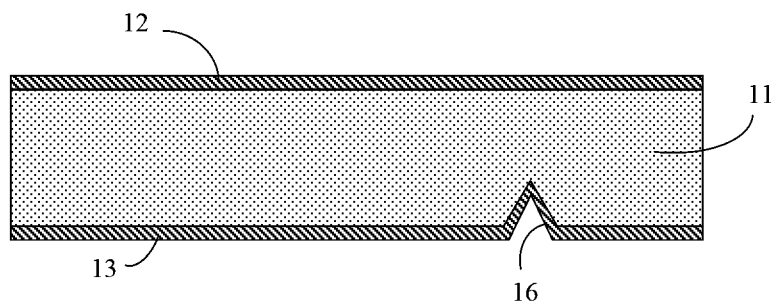
FIG. 5
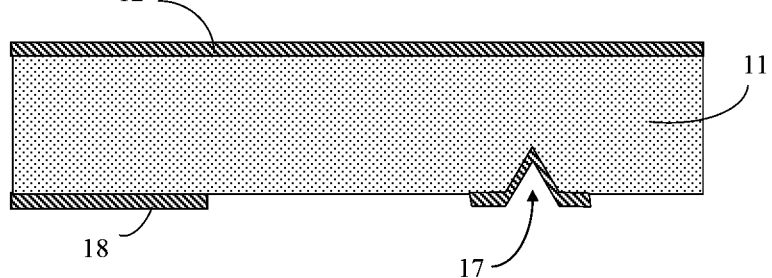
FIG. 6
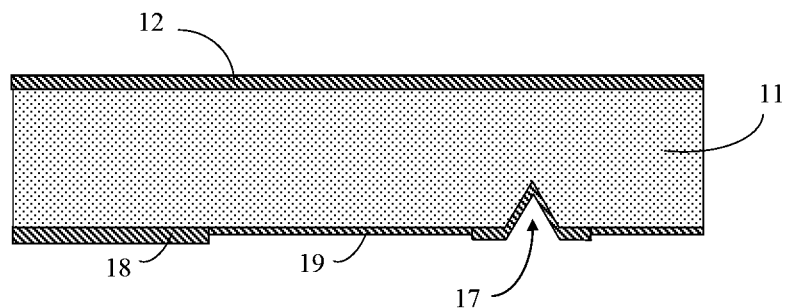

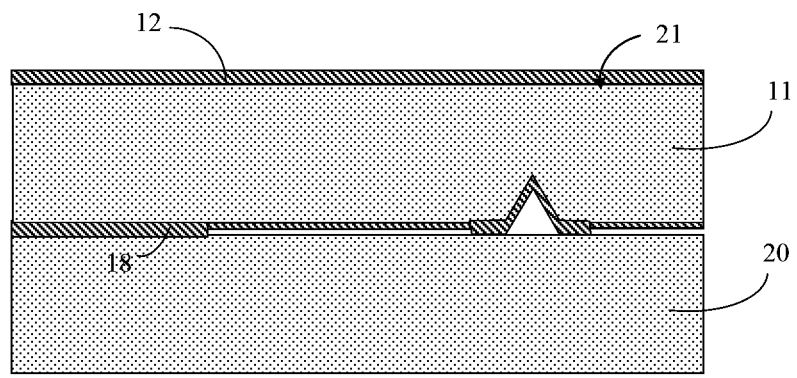
FIG. 8
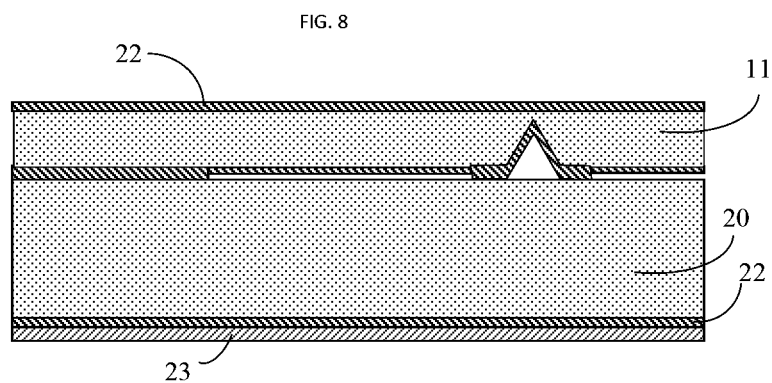
FIG. 9
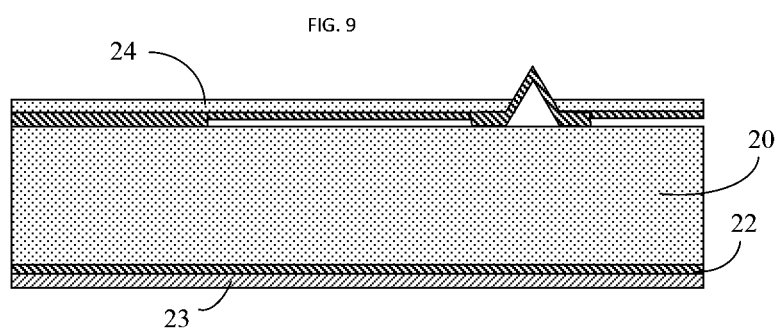

VERTICAL EMBEDDED SENSOR AND PROCESS OF MANUFACTURING THEREOF

RELATED APPLICATIONS

This application claims priority to U.S. Provisional Application Ser. No. 61/822,362 filed May 11, 2013

GOVERNMENT SPONSORED RESEARCH

This material is based upon work supported by the National Science Foundation under Grant No. IIP-1256640

BACKGROUND OF THE INVENTION

This invention pertains to the field of scanning probe microscopy and to micro-electro-mechanical devices with nanometer probe tips having integrated sensor elements.

Scanning probe microscopy (SPM) is used to provide information about the surface structure and physical properties of a measurement sample with nanometer or angstrom scale resolution. SPM measurements are typically performed using a physical probe, which for many applications may be a sharp needle-like tip located at the distal end of a micromachined cantilever. The tip is brought in contact with or in close proximity to a sample and interacts with the sample at one or more points in a controllable manner. In some cases, a scan is carried out in a raster pattern using a piezoelectric-controlled tube to which the probe is attached or by moving the sample using a piezoelectric-controlled stage, and the purpose of the scan may be to produce a nanometer scale map of the surface topography. In this mode, the tip interacts with the sample surface resulting in a detectable signal which, along with information about the position of the tip relative to the sample, is used by a graphical computer to construct a two dimensional map of a desired physical property and/or a three dimensional image of the surface topography.

Tip-sample interactions may include any number of physical interactions: mechanical, electrostatic, magnetic, thermal, chemical, or optical. Atomic force microscopy (AFM), for example, uses the mechanical force between a probe tip and a sample surface to map topography. AFM probes are relatively simple structures typically consisting of silicon or silicon nitride tips with nanometer radius of curvature.

Measuring physical properties besides topography may use probes with sensing structures at or near the tip. Such probes can be used to measure magnetic domains, electrochemical signals or thermal properties. To measure temperature, for example, a thermocouple, thermistor, or Schottky diode sensor can be constructed near the probe tip.

BRIEF SUMMARY OF THE INVENTION

In some embodiments, a method is provided for forming a scanning probe assembly which may consist of a probe body, a cantilever extending from the probe body, a sharp tip at the distal or free end of the cantilever and a sensor element integrated into the tip. In some embodiments, the sensor element may be (i) nanometer in size, (ii) localized to the tip apex and (iii) orthogonal to the sample surface. The sensor element may form in whole or part any number of sensor types including, but not limited to, thermocouple junction, thermistor, Schottky diode, ultramicroelectrode, or Hall Effect sensor. In some embodiments, topographical measurements may be performed in a manner similar to an AFM probe. As a result two or more tip-sample interactions may be simultaneously imaged during a single scan of a sample.

In some embodiments batch fabricating a plurality of probes in a robust and economical manner is possible. The fabrication process overcomes limitations of forming the sensor at the apex of the tip using electron-beam lithography or micro photolithography. In other embodiments fabrication processes may rely on standard techniques commonly used to create micro-electro-mechanical systems (MEMS).

Various embodiments of a tip are described. The probe body and cantilever may be silicon and the tip may be silicon dioxide. The tip may be a hollow tetrahedral shape. The cantilever may have a backside and a front-side, the front-side comprising the tip apex. A first dielectric may be disposed on the front and backside of the probe. A first conductive layer may then be disposed on the front-side of the cantilever and probe body followed by a second dielectric disposed on the first conductive layer, embedding the conductive layer. A nanometer through-hole or aperture may be fabricated at the tip apex. The hole may be filled with a second conductor by means of electrochemical deposition using the first conductor as a seed layer. The electrochemical deposition may be accomplished using an electrolyte fluid having the ability to infiltrate the nanometer hole, allowing the second conductor to be disposed throughout the hole. The electrochemical process can be reliably controlled by monitoring temperature, deposition time and current enabling precise control of the disposed material thickness and the amount of material protruding from the apex of the tip. The second conductor, having material properties dependent on the surrounding environment or measurement sample, may produce a measurable signal in response to changes in the environment or measurement sample, thereby forming a sensor localized to the tip apex. A third conductive layer may be embedded as a lower layer toward the backside of the cantilever and probe body. The material in the tip apex may form an electrical junction with conductors one and three. Thus the sensor element may be monitored electronically by making electrical contact with conductor one on the probe surface and conductor three on the backside of the probe body.

In other embodiments, both electrical contacts to the sensor element may be made on the same layer of the probe body. A vertical interconnect access (VIA) hole may be created in the cantilever or probe body to bring conductor three to the same layer as conductor one. Conductors one and three may then be patterned on the common layer to form electrical bond pads.

In other embodiments, the scanning probe may be made using a silicon probe body and a silicon nitride cantilever and tip. The silicon nitride cantilever has a low spring constant conducive to imaging soft structures such as biological samples.

In other embodiments, the material filling the through-hole at the apex of the tip, in response to an environmental stimulus, may modify the current in a nearby electrical circuit or an environmental stimulus may modify a current passing through the sensor element which in turn modifies the electrical potential of a nearby electrode. Such a scanning probe may be used as a Hall Effect sensor.

In other embodiments, the first, second and third conductor may be the same material forming a thermistor sensor.

In other embodiments, the second conductor may be the same as the first conductor and the third conductor may be a material different from conductors one and two forming a thermocouple junction.

In other embodiments, the second conductor may be the same material as the third conductor and the first conductor may be a material different from conductors two and three forming a thermocouple junction.

BRIEF DESCRIPTION OF THE DRAWINGS

The invention will be better understood by referring to the following Figures.

FIG. 1 is an isometric view of an embodiment of the scanning probe assembly with tetrahedral tip, sensor element and connecting metal lines.

FIGS. 2-13 and 15-18 are cross-sectional views sequentially illustrating the steps in the fabrication of a first embodiment of a scanning probe assembly including a silicon cantilever.

DETAILED DESCRIPTION OF THE INVENTION

Figure 10:
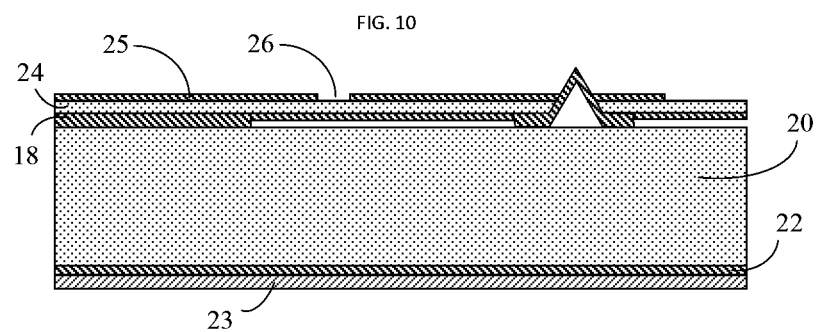

Specialized probes can provide insight into a number of material properties and phenomena, but it can be difficult to achieve sufficiently high spatial resolution and measurement sensitivity. There are two primary obstacles to improving resolution and sensitivity. First, the resolution is limited by the size of the tip-sample interaction volume with smaller tip sizes achieving higher resolution. However, tip sensors typically consist of non-planar structures, multiple materials and electrical connections making them relatively large; often as much as an order of magnitude larger than a conventional AFM probe tip. Secondly, most tip-sample interactions are near-field effects and as such, the sensor must be brought as close to the sample surface as possible. Preferably the sensor should be at the apex of the tip for maximum sensitivity. Creating a sensor at a sharp point, nevertheless, is challenging. Current fabrication methods include photolithography and electron beam lithography, both of which have achieved only limited success. Optical masks used in photolithography cannot be aligned with nanometer precision at the apex of the tip and the resolution is limited to approximately 300 nanometers. Electron beam lithography can achieve much higher resolution, but performing lithography on a non-planar surface, especially at the apex of the tip, is difficult. The electron beam lithography is also an expensive process. Moreover, one cannot adequately control the deposition thickness of the photoresist or electron beam resist at the tip making repeatability poor and lowering yields.

Exemplary embodiments of the invention are described below and in the figures. One skilled in the art will appreciate that various departures and modifications to the exemplary embodiments are possible and would still fall within the teachings of the current disclosure.

The scanning probe assembly 1 of a first embodiment of the invention is illustrated in FIG. 1. The assembly comprises the probe body 2 with a cantilever 3 that extends outwardly from the surface of the probe body, the distal end or free end of the cantilever having a tip 4. The tip extends upwardly, perpendicular to the probe body surface, in a tetrahedral shape terminating in a sharp apex wherein a sensor element 5 resides. The tip is a hollow structure, the sensing element extending throughout the tip. The backside or non-tip side of the cantilever may form a reflective surface 10 suitable for an optical deflection detector as used by some atomic force microscopes. Electrical contact with the sensing element is made using metal bond pad one 6 and two 7 on the probe body surface. The metal layers are isolated from the probe surface by a dielectric layer 8. The first metal pad extends to the tip apex and the second metal pad extends to a vertical interconnect access hole 9 in the cantilever and from there to the backside of the sensing element. Although omitted from FIG. 1 for clarity, a second dielectric encapsulates the probe surface except at the sensing element.

The exemplary probe is fabricated using silicon micromachining and semiconductor processing techniques. The process begins with a first silicon wafer, designated the device wafer. The wafer is a double-side polished, <100> monocrystalline silicon wafer with the principal surface extending parallel to a (100) crystalline plane. As illustrated in cross-sectional view of FIG. 2, the device wafer 11 is thermally oxidized to form a dielectric layer of silicon dioxide (oxide one) to form upper 12 and lower 13 silicon dioxide layers on opposed principal surfaces. The silicon dioxide is referred as oxide or silicon dioxide layers hereafter. The oxide thickness is in the exemplary range of 10 nm to 1 μm. The oxide may also be deposited by other means such as chemical vapor deposition (CVD) or plasma enhanced CVD. A photoresist layer is deposited and then patterned on the lower oxide using a photolithographic process common to semiconductor processing. The lower oxide layer is etched to define an opening 14 to the silicon device wafer as illustrated in FIG. 3. The oxide may be etched using a wet etchant or a dry etch process. The photoresist is removed from the wafer using a solvent. The silicon device wafer is anisotropically wet etched using any etchant whose etch rate depends on the silicon crystalline planes such as hot potassium hydroxide (KOH) or tetramethylammonium hydroxide (TMAH). The etchant forms a pit with an inclined plane 15 at an angle of 54.7° from the (100) silicon plane bounded by the (111) plane. The silicon device wafer may also be etched using a dry etch process such as reactive ion etching (RIE) providing a sidewall angle from 45° to 90°. The silicon wafer is then stripped bare using a wet oxide etch and cleaned using any number of standard process as known in the art.

The device wafer is thermally oxidized 16 (oxide two) creating the structure in FIG. 4. The oxide thickness is in the exemplary range of 10 nm to 2 μm. A photoresist is deposited and patterned on the lower side of the device wafer. As illustrated in FIG. 5, oxide two on the lower side of the device wafer is etched using a wet or dry etch process with the photoresist acting as a mask. The remaining oxide forms a buried oxide tip 17 and an oxide bond pad 18. Subsequently, the device wafer is thermally oxidized 19 (oxide three) to a thickness less than the thickness of oxide two, which is illustrated in FIG. 6.

A second <100> monocrystalline silicon wafer 20, designated the support wafer, having two polished sides, is bonded to the lower side of the device wafer 11 resulting in the structure in FIG. 7. The wafer bonding may be accomplished with field-assisted thermal bonding or fusion bonding as common in the art. The upper surface 21 of the device silicon wafer 11 is mechanically ground and polished to a thickness just above the buried oxide tip. The bonded wafers are thermally oxidized as illustrated in FIG. 8 creating an oxide 22 (oxide four) with an exemplary thickness range of 10 nm to 1 μm. A silicon nitride layer 23 is deposited on the lower surface of the support wafer 20, the silicon nitride having an exemplary thickness of 10 nm to 1 μm.

Figure 11:
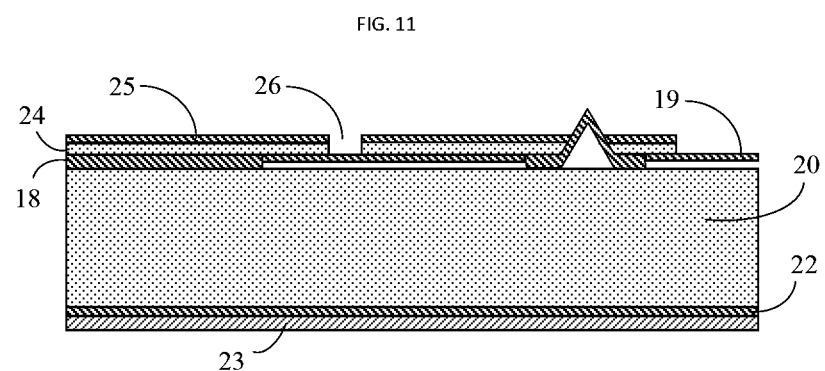

Next, oxide four 22 is removed from the upper surface of the silicon device wafer using wet or dry etching. The upper surface of the silicon device wafer 11 is etched to the thickness of the cantilever 24 using wet or dry etching creating the structure in FIG. 9. The cantilever thickness has an exemplary range of 0.1 to 10 μm. In FIG. 10, an oxide layer 25 (oxide five) is thermally grown or deposited on the upper surface of the device wafer having an exemplary range of 10 nm to 1 μm. Alternatively, other materials such as silicon nitride could be deposited in place of oxide five. Oxide five is photolithographically patterned and wet or dry etched creating the shape of the probe body and cantilever with an opening for via 26 in the cantilever for making a through-hole. The through-hole will be used to create an electrical connection to the lower side of the probe tip. Alternatively, a through hole could be made in the probe body terminating at the buried oxide (oxide two) 18. As depicted in FIG. 11, using oxide five 25 as a hard mask, the exposed silicon device wafer surface is etched to the buried oxide three 19 in the pattern of the probe body and cantilever using a wet or dry etch process. Oxide five is completely removed from the surface of the silicon device wafer using a wet or dry etch. At the same time, buried oxide three 19 at the bottom of the via 26 may be partially or fully etched.

Figure 12:
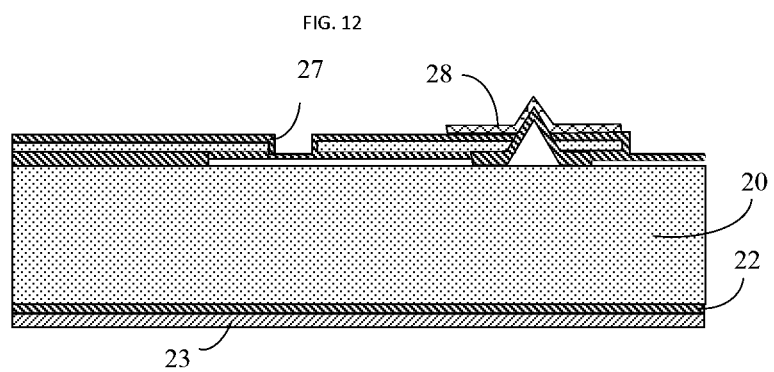
Figure 13:
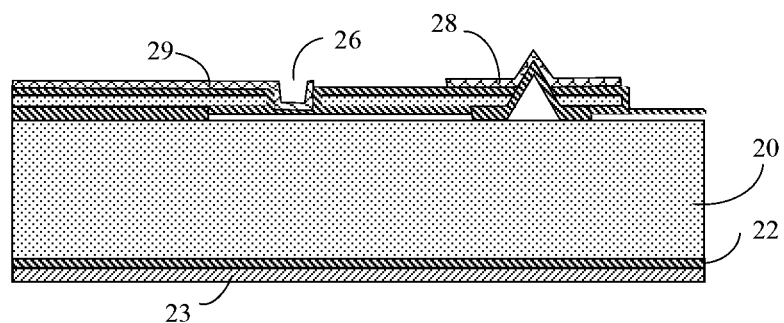
Figure 14:
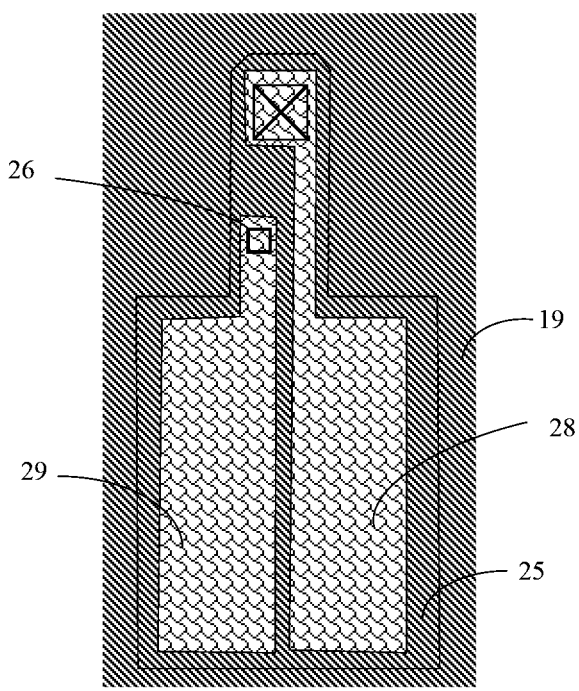
FIG. 14 is a top view of the device.

A sixth oxide 27, an electrical insulator layer, is thermally grown or deposited on the surface of the silicon device wafer. Metal one 28 is deposited on the surface of oxide six 27 as illustrated in FIG. 12. Metal one will later form part of the electrical connection to the tip sensor element. A photoresist layer is deposited on metal one and patterned in the shape of an electrical contact pad on the probe body and as a contact path on the cantilever covering the oxide tip 17. Metal one is then etched using a wet or dry etch process in the pattern of the photoresist. Alternatively, the photoresist could be deposited on the surface of oxide six 27 and the silicon device wafer prior to metal one 28 deposition. The resist could then be patterned such that an opening in the resist is created in the pattern of the desired electrical connection as described. Metal one 28 could then be deposited and the metal on top of the photoresist removed by removing the photoresist underneath the metal, with a "lift-off" process. A cross-sectional view of the structure and a surface view of the device wafer are illustrated in FIGS. 13 and 14 respectively. A second metal 29 is deposited on the sixth oxide layer 27 to form a second electrical pad and a metal contact line to the cantilever via 26. Likewise metal two is patterned using the same processes as metal one. Metal one and two and the entire device wafer surface are then covered by a seventh oxide layer 30 using, for example, CVD or plasma enhanced CVD. Alternatively, other electrically insulating materials may be used in place of the seventh oxide.

Figure 15:
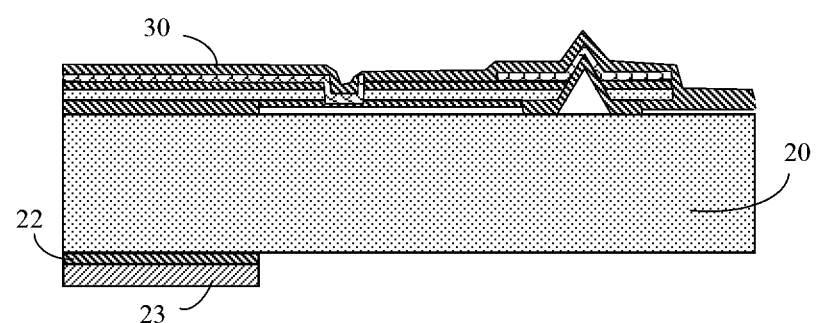
Figure 16:
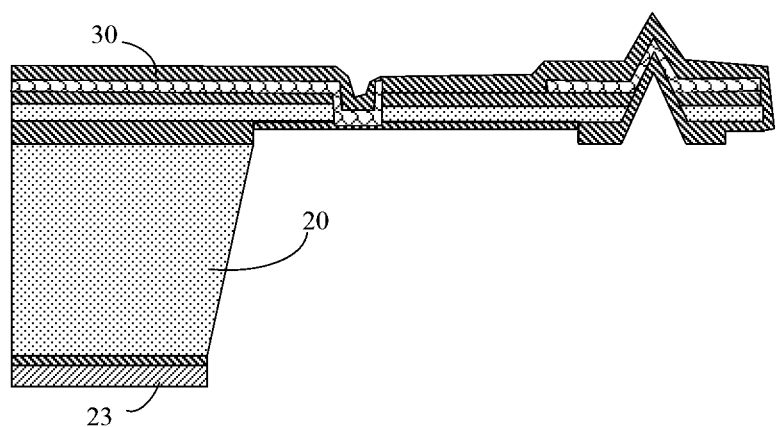

The lower side of the silicon support wafer is patterned next as illustrated in FIG. 15. The lower silicon nitride 23 layer is photolithographically patterned in the shape of a probe body, support structures and wafer frame. The silicon nitride layer is then used as a hard mask to etch oxide four 22 layer using wet or dry etch process. The silicon nitride 23 and oxide four 22 layers are then used as a hard mask for anisotropically etching the silicon support wafer 20, as illustrated in FIG. 16. The anisotropic etchant may be any wet etchant whose etch rate depends on the silicon crystalline planes or etching may be carried out with a standard deep silicon dry etching technique. As an alternative, the oxide layer 22 may be completely replaced by silicon nitride layer 23.

Figure 17:
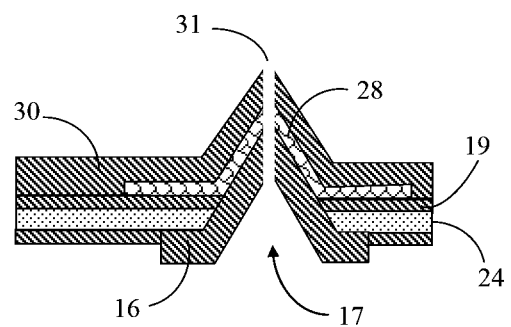

A through-hole or aperture 31 is then formed in the tip apex, puncturing oxide two 16, metal one 28, and oxide seven 30. The hole may be created using focused ion beam (FIB) milling. The tip structure is illustrated in FIG. 17. The hole may be circular with an exemplary diameter of 10 nm to 200 nm or square with an exemplary side length of 10 nm to 200 nm. The hole may be created from either the upper or lower side of the tip. Alternatively, the hole could be formed slightly to the side of the apex.

The through-hole is filled with metal three 32, the sensor element, using an electrochemical deposition such as electroplating or electroless plating. The milled hole exposes metal one 28 to an electrolyte fluid allowing metal one to form the seed layer for the electrochemical deposition. Oxide seven 30 protects all other metal areas from the electrolyte preventing metal three from forming outside of the apex hole. The diameter of the sensor element is determined by the hole diameter and the length of the sensor element is determined by the thickness of the tip oxide 16, metal one 28 and oxide seven 30. Since it is possible to achieve an aperture diameter as small as a few nanometers, it is possible to create a sensing element suitable for high resolution imaging.

Figure 18:
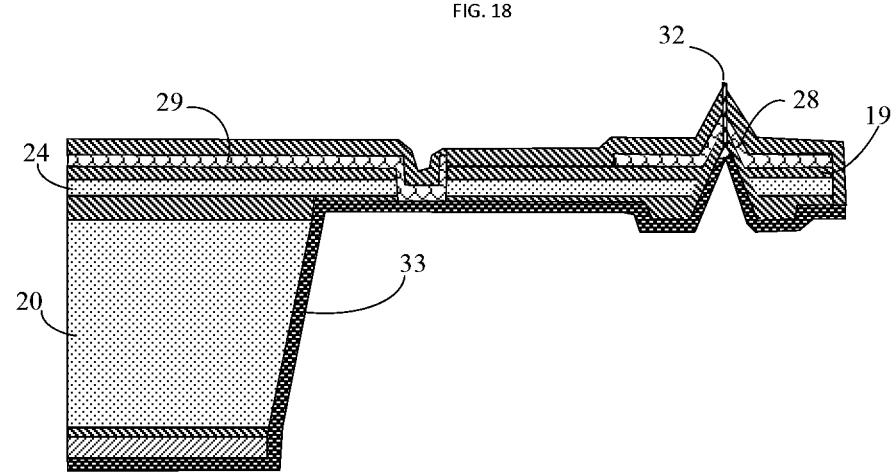

The backside of the via 26 having oxide 19 is etched to reveal metal two 29. A fourth metal 33 is deposited on the backside or non-tip side of the cantilever 24 and silicon support wafer 20. Metal four 33 forms an electrical connection from metal three 32 (the sensor element) to metal two 29 in the cantilever via 26. FIG. 18 illustrates a cross-sectional view of the final structure.

In batch fabrication, multiple probe assemblies may be created simultaneously within a grid or matrix with an outer frame and final support structure between probes. The individual probe assemblies, upon completing the above described fabrication, may be separated from the grid by physical removal for use in SPM.

For the above described embodiment of the invention, the various material layers built up in the fabrication process result in the tip sensing element being both electrically and thermally isolated from the probe body and tip. In FIG. 18, oxide three 19 isolates the electrical lines from the cantilever and oxide seven 30 protects the tip-side of the cantilever except at the apex of the tip from the ambient environment. This has the benefit of restricting tip-sample interactions to a small region determined by the amount of sensor material 32 protruding from the tip. In addition, the tip sidewalls are insulating such as oxide 16 which has high electrical resistance and low thermal conductivity, further localizing measurements to the apex sensor element.

Moreover, the conductors are embedded within the body of the probe, i.e. they are covered with other layers that are preferably non-conductive and mechanically tough. Although oxide seven 30 as illustrated in FIG. 18, is shown to encapsulate the probe body and cantilever, other dielectric materials such as chalcogenides may be used to achieve the same purposes. This has the advantage that the probe assembly can be made to be environmentally resistant to chemicals, heat transfer or electrical current flow allowing for example, use in fluids, typically not possible with electrically active probes.

Since the active sensor element is formed by electrochemical deposition in a milled hole, the fill material can be chosen to be a precursor for growth of other structures extending from the filled hole, for example a nanotube or electron-beam-deposited carbon. Such grown structures can result in smaller tip radii than achievable directly from the MEMS fabrication processes. In addition the hole may be milled at any angle into the tip and will still fill during deposition, which would provide tilt-compensation and may be advantageous for some applications such as imaging deep trenches.

Figure 19:
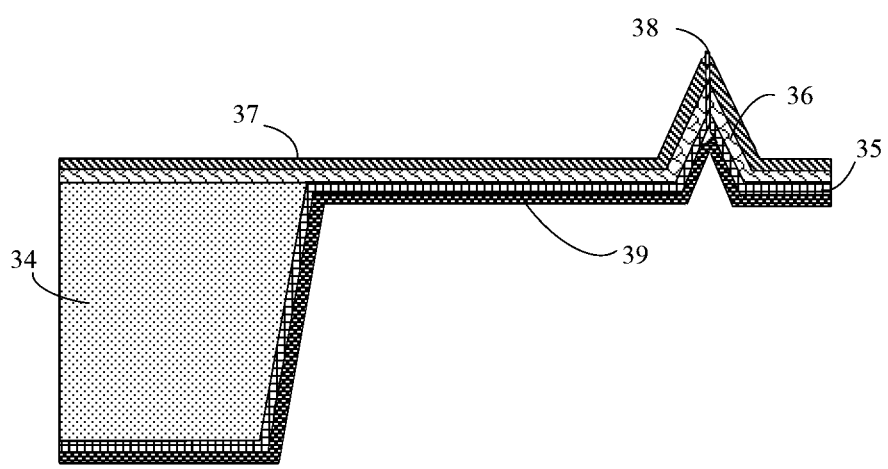
FIG. 19 is a cross-sectional view of a second embodiment of a scanning probe assembly having a silicon body and a silicon nitride cantilever and tip.

In another exemplary embodiment, the tip sensor element can be constructed in a hollow silicon nitride tip such as illustrated in FIG. 19. The scanning probe assembly comprising a silicon body 34, and silicon nitride cantilever and tip 35 are known in the art. The aforementioned fabrication procedure can be modified to create a nanometer sensor element at the apex of such a structure. Starting from a standard silicon nitride probe, a metal layer (metal five) 36 is deposited on the surface of the probe followed by an oxide layer (oxide eight) 37. As in the first exemplary embodiment, a through-hole is milled at the tip apex through the silicon nitride tip 35, metal five 36 and oxide eight layer 37. Metal six 38 is deposited in the tip hole using electrochemical deposition. A backside metal seven 39 is deposited on the non-apex side of the tip, cantilever and probe body. Metal five 36 and metal seven 39 thus form electrical contact lines to the sensor element, metal 38. To make an electrical connection to the sensor, an upper and lower probe body surface connection is made to metal five 36 and seven 39 respectively.

Figure 20:
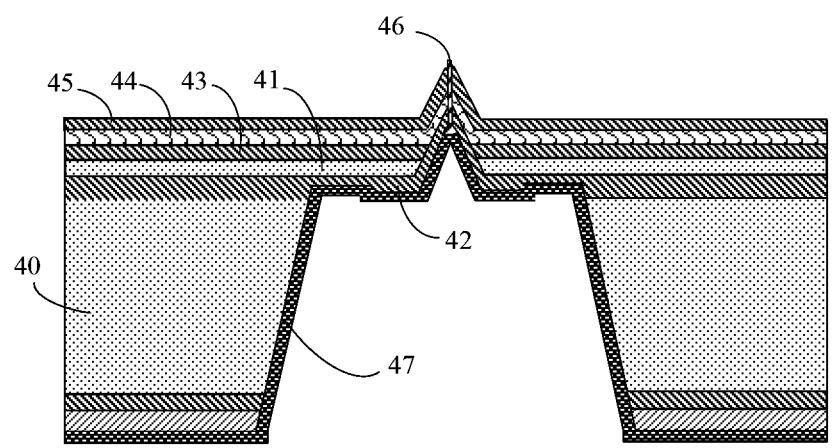
FIG. 20 is a cross-sectional view of a third embodiment of the scanning probe assembly showing a sensor element at the apex of a tip suspended on a membrane.

In another embodiment of the invention, the tip sensor can be constructed on a membrane as illustrated in FIG. 20. The probe assembly comprises a silicon body 40, a membrane 41 suspended on the surface of the body, such that the body forms a frame around the membrane, and dielectric (e.g. silicon dioxide) tip 42. An electrically insulating layer 43 is disposed on the surface of the probe assembly, followed by a metal (metal eight) and an electrically insulating layer 45. The electrically insulating layer may be any number of materials such as silicon oxide or other dielectric materials such as a chalcogenide glass. The tip has a sensor element (metal nine) 46 at the apex of the tip, created through electrochemical deposition using metal eight as a seed layer. The back of the probe assembly is covered by a tenth metal 47 which creates an electrical connection through the sensor element and to the upper surface metal 44. Metal 10 may be brought to the upper surface through a via in the silicon body 40 such that metals 44 eight and ten 47, the connecting metal lines to the tip, are on the same side of the silicon body for improved accessibility.

We claim:

1. A micromachined scanning probe comprising:
   (a) a probe body with an edge and a surface,
   (b) a cantilever beam secured to the probe body surface extending outwardly from the edge,
   (c) a hollow pointed tip extending from the cantilever beam at the distal end of the beam in a direction away from the probe body surface,
   (d) a dielectric material (dielectric one) covering the entire surface of the scanning probe except at the sensing element,
   (e) a second dielectric material on the backside (non-tip side) of the probe body and cantilever beam,
   (f) a first conductor (conductor one) on the surface of the first dielectric material extending along the cantilever beam to the tip terminating at a junction with the sensor
   (g) a sensing element extending through the tip at the apex of the tip being aligned in the direction of the tip axis,
   (h) a second conductor (conductor two) on the backside of the cantilever beam on the second dielectric, extending to the distal end of the beam terminating at a junction with the backside of the sensor, such that an electrical connection can be made through the first and second conductors to/from the sensor, and
   (i) a third dielectric material covering conductor one.

2. The scanning probe according to claim 1, wherein the sensing element is formed through electrochemical deposition using conductor one as a seed layer.

3. The scanning probe according to claim 1, wherein a hole is milled through the tip using a focused ion beam to create the housing for the sensor.

4. The scanning probe according to claim 1, wherein at least one of; the probe body and cantilever are monolithic single crystalline silicon and the tip is silicon oxide; the probe body is monocrystalline silicon, the cantilever beam is silicon nitride, the distal end of the cantilever is a silicon pad and the tip is silicon oxide; the probe body is single crystalline silicon and the cantilever beam and tip are silicon nitride; or the probe body and cantilever beam are silicon and the tip is silicon nitride.

5. The scanning probe according to claim 1, wherein a through-hole extends through the cantilever beam to allow conductor two to pass through the beam to the surface of the beam and to the surface of the probe body.

6. The scanning probe according to claim 1, wherein a through-hole extends through the probe body to allow conductor two to extend from the underside of the probe body through the through-hole and to the surface of the probe body.

7. A method for manufacturing a scanning probe comprising the steps of:
   (a) forming a first dielectric layer on a substrate (substrate one), said substrate being a monocrystalline silicon substrate having an upper side and an opposite lower side,
   (b) developing an opening in the first dielectric layer on the lower side of the first substrate and forming a tetrahedral pit in the silicon substrate at the opening in the first dielectric layer,
   (c) removing the first dielectric layer from the first substrate,
   (d) forming a second dielectric layer on the first substrate, such that the tetrahedral pit is filled with the second dielectric layer forming a buried tip,
   (e) bonding a second monocrystalline silicon support substrate to the second dielectric layer of the first silicon substrate on the lower side,
   (f) removing silicon material from the first silicon substrate at the upper side opposite the tetrahedral pit such that the second dielectric material in the tetrahedral pit is exposed revealing a tetrahedral tip,
   (g) forming a third dielectric layer on the upper side of the first substrate,
   (h) developing a cantilever pattern in the third dielectric layer and developing a cantilever from the first silicon substrate according to the cantilever pattern in the third dielectric layer, such that the cantilever has a support structure from the first silicon substrate at the proximal end and extends to the tetrahedral tip at the distal end,
   (i) developing a through-hole in the cantilever using an opening in the third dielectric such that a hole is created through the cantilever at the time the cantilever is formed in the first silicon substrate,
   (j) forming a fourth dielectric layer on the first silicon substrate on the upper side of the substrate,
   (k) forming a first conductor layer on the fourth dielectric layer and developing the first conductor layer such that a narrow trace extends along the cantilever to the tetrahedral tip,
   (l) forming a second conductor layer on the fourth dielectric layer and developing the second conductor layer such that a narrow trace extends along the cantilever to the through-hole,
   (m) forming a fifth dielectric layer on first silicon substrate such that the first and second conductor layers are covered,
   (n) forming a sixth dielectric layer on the lower side of the second silicon substrate and forming a probe body pattern in the sixth dielectric, (o) developing a probe body in the second silicon substrate according to the pattern in the sixth dielectric,
(p) creating a through-hole at the tetrahedral tip,
(q) filling the hole with a third material
(r) forming a fourth conductor layer on the lower side of the tip and cantilever such that the fourth conductor makes contact with the third material and the second conductor in the through-hole.

8. The method of claim 7, wherein the first and second silicon substrates are <100> monocrystalline silicon wafers with the principal surface extending parallel to a (100) crystalline plane.

9. The method of claim 7, wherein the second dielectric is silicon dioxide.

10. The method of claim 7, wherein the tetrahedral pit forming step (b) includes exposing the first silicon substrate to at least one of a dry or liquid anisotropic etchant.

11. The method of claim 7, wherein probe body forming step (o) includes exposing the second silicon substrate to a dry or liquid anisotropic etchant.

12. The method of claim 7, wherein the tip through-hole is created using a focused ion beam.

13. The method of claim 7, wherein the through-hole in the tip may be at the apex of the tip or adjacent to the apex.

14. The method of claim 7, wherein the third material is a metal capable of being deposited through electrochemical means using the first conductor as a seed layer.

15. The method of claim 7, wherein an opening is created in the sixth dielectric during the forming step (n) such that a through-hole is created in the probe body during the development of the probe body, step (o), and the fourth conductor makes contact with the second conductor in the through-hole.

16. A micromachined scanning probe assembly comprising a probe body and a cantilever beam extending outward from the probe body with a hollow tip structure at the distal end of the cantilever and at least two embedded conductors passing along the cantilever beam, the two conductors separated by at least one dielectric layer, wherein the two conductors make contact with a third material embedded in the hollow tip, such that the third material connects the two conductors.

17. The scanning probe according to claim 16, wherein the third material fills a machined hole at the tip and the third material extends out of the tip forming the tip apex.

18. The scanning probe according to claim 16, wherein the third material is sensitive to heat, magnetism, electromagnetic radiation, electrochemical energy, or chemical compound.

19. The scanning probe according to claim 16, wherein the two conductors are different materials and the third material is the same material as one of the conductors such that a thermocouple sensor is formed at the tip.

20. The scanning probe according to claim 16, wherein the two conductors and the third material are the same materials such that a thermistor sensor is formed at the tip.

* * * * *